US006728686B2

(12) United States Patent
Kasai et al.

(10) Patent No.: US 6,728,686 B2
(45) Date of Patent: *Apr. 27, 2004

(54) ELECTRONIC MONEY HOLDING DEVICE AND ELECTRONIC MONEY AUTOMATIC PAYMENT METHOD

(75) Inventors: Shinichi Kasai, Emeryville, CA (US); Kazuhiro Kawashima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 10/293,300

(22) Filed: Nov. 14, 2002

(65) Prior Publication Data

US 2003/0074314 A1 Apr. 17, 2003

Related U.S. Application Data

(63) Continuation of application No. 09/551,202, filed on Apr. 17, 2000, now Pat. No. 6,502,078, which is a continuation of application No. 09/927,671, filed on Sep. 10, 1997, now Pat. No. 6,058,382.

(30) Foreign Application Priority Data

Sep. 12, 1996 (JP) .............................................. 8-241606

(51) Int. Cl.[7] .............................................. G06F 17/60
(52) U.S. Cl. ............................ 705/41; 705/40; 235/380
(58) Field of Search ............................... 705/13, 39–42; 235/380

(56) References Cited

U.S. PATENT DOCUMENTS

| | | | |
|---|---|---|---|
| 4,823,264 A | 4/1989 | Deming | |
| 4,959,788 A | 9/1990 | Nagata et al. | |
| 5,220,501 A | 6/1993 | Lawlor et al. | |
| 5,325,431 A | 6/1994 | Naruse | |
| 5,383,113 A | 1/1995 | Kight et al. | |
| 5,455,407 A | 10/1995 | Rosen | |
| 5,465,206 A | 11/1995 | Hilt et al. | |
| 5,483,445 A | 1/1996 | Pickering | |
| 5,590,038 A | 12/1996 | Pitroda | |
| 5,679,939 A | * 10/1997 | Watanabe | .................... 235/379 |
| 5,745,886 A | 4/1998 | Rosen | |
| 5,748,737 A | 5/1998 | Daggar | |
| 5,754,655 A | 5/1998 | Hughes et al. | |
| 5,832,464 A | 11/1998 | Houvener et al. | |
| 5,873,072 A | 2/1999 | Kight et al. | |
| 5,956,700 A | 9/1999 | Landry | |
| 6,058,382 A | * 5/2000 | Kasai et al. | .................... 705/41 |
| 6,213,390 B1 | * 4/2001 | Oneda | .................... 235/379 |
| 6,438,527 B1 | * 8/2002 | Powar | .................... 705/40 |
| 6,502,078 B2 | * 12/2002 | Kasai et al. | .................... 705/41 |
| 2001/0018739 A1 | 8/2001 | Anderson et al. | |

FOREIGN PATENT DOCUMENTS

| | | |
|---|---|---|
| JP | 2-285464 A | 11/1990 |
| JP | 8-016670 | 1/1996 |

OTHER PUBLICATIONS

"Electronic Money Is Turned To Practical Use," *Weekly Diammond*, Jan. 1996.
Levy, "Electronic Money Changes The World," *WIRED* (JP Ed.), May 1995, pp. 68–75 and 136–139.
Cummings, "Home Banking With Quicken," *MIS Press*, Chapters 4–6, Jan. 17, 1995.

\* cited by examiner

*Primary Examiner*—Susanna Meinecke-Díaz
(74) *Attorney, Agent, or Firm*—Antonelli, Terry, Stout & Kraus, LLP

(57) ABSTRACT

An electronic money holding device has a first storage unit for storing a uniquely assigned identification number and an amount of held electronic money, a processor for controlling the reference to and the updating of the amount of held electronic money and the transfer of electronic money between the electronic money holding device and another electronic money holding device, and a second storage unit for storing information of service providers concluding sales contracts with a possessor of the electronic money holding device and payment information of each sales contract.

6 Claims, 3 Drawing Sheets

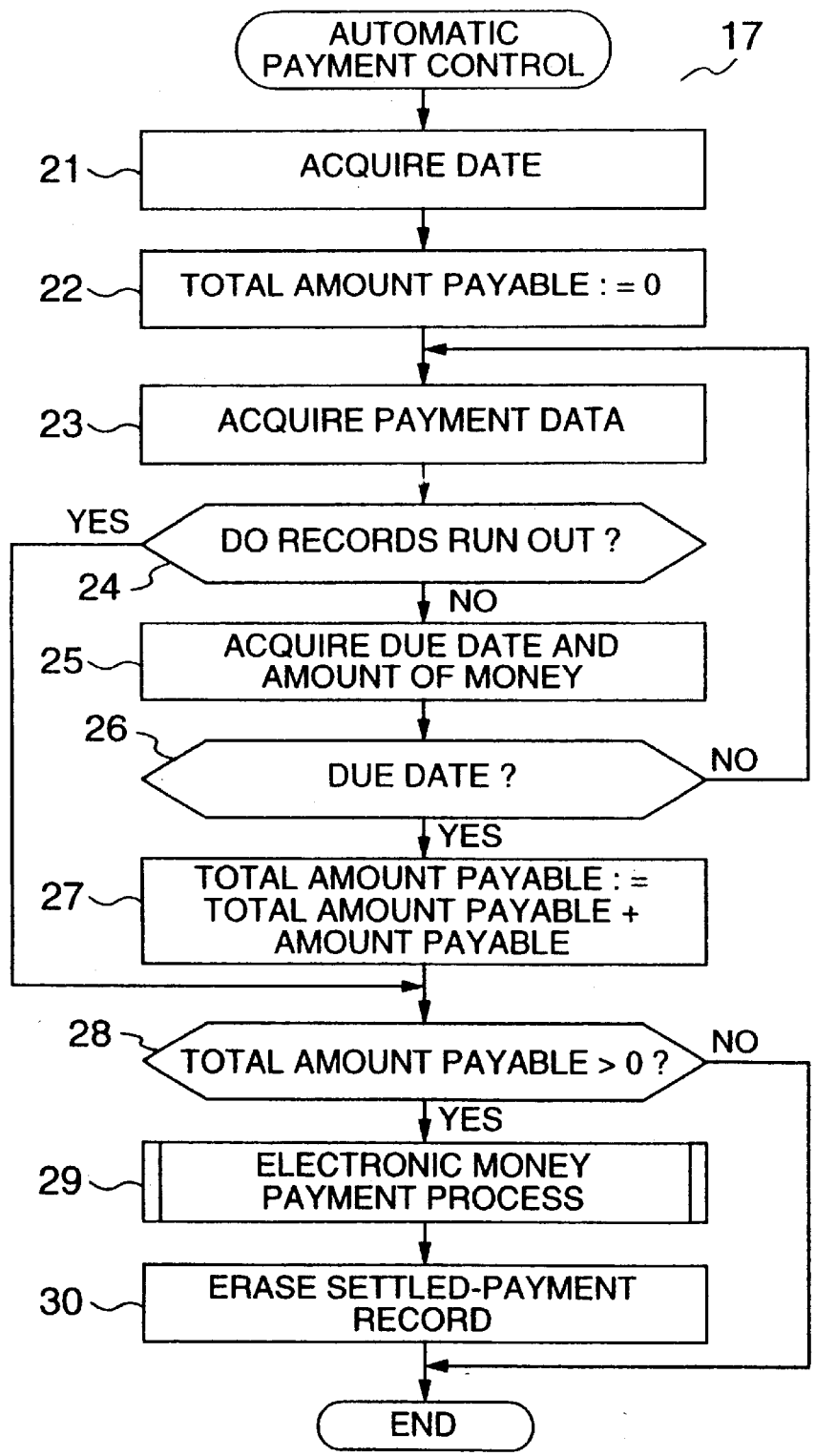

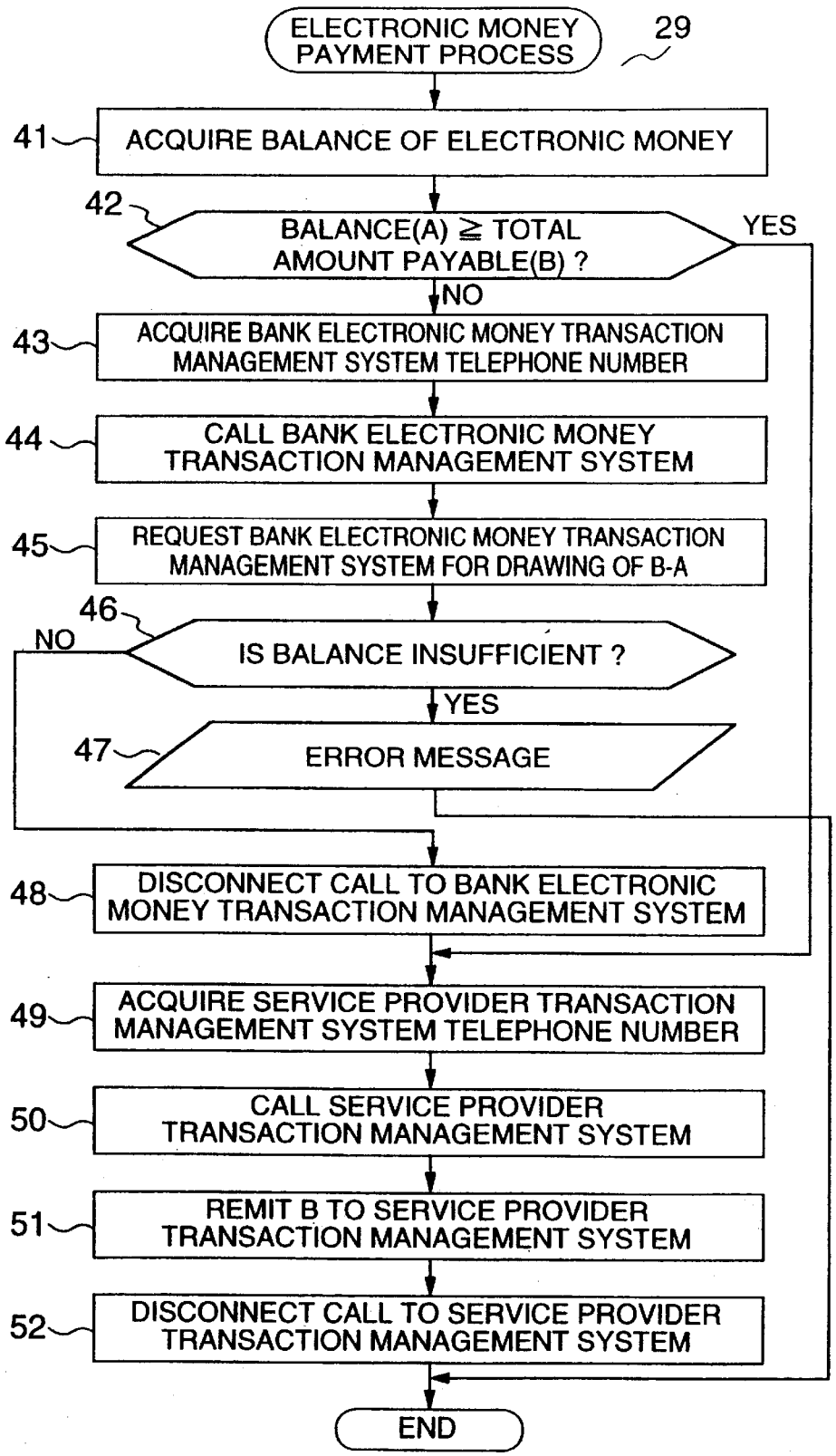

ELECTRONIC MONEY HOLDING DEVICE AND ELECTRONIC MONEY AUTOMATIC PAYMENT METHOD

CROSS-REFERENCE TO RELATED APPLICATIONS

This application is a continuation of Ser. No. 09/551,202 filed Apr. 17, 2000 and issued as U.S. Pat. No. 6,502,078, which is a continuation of Ser. No. 09/927,671 filed Sep. 10, 1997 and issued as U.S. Pat. No. 6,058,382.

BACKGROUND OF THE INVENTION

1. Field of the Invention

The present invention relates to an electronic money holding system, and more particularly to an electronic money holding device which makes it possible to automatically perform a payment having an amount payable and a due date both known from a contract beforehand, and an electronic money automatic payment method which uses such a device.

2. Description of the Related Art

As a method in which so-called "electronic money" is held in an IC chip on an IC card and is transferred through a network, there is known a method based on MONDEX money as disclosed by, for example, "Shukan Diamond (combined number in the New Year of Heisei 8)" published on January 1996.

In this conventional payment method using the IC card, the IC card is set into a dedicated reader/writer (or IC card reader/writer). Thereafter, for example, a payer manually operates a dedicated telephone or a personal computer (PC).

On the other hand, as a method in which an amount of money prescribed by a contract is paid to a service provider on a date prescribed by the same contract, there is a method for an automatic transfer through a bank account. This payment by automatic transfer through a bank account is realized by an accounting system which manages a ledger database and processes a payment transaction. In the accounting system, the process is performed in accordance with the same procedure irrespective of the amount of money to be paid.

In the payment by automatic transfer through a bank account, the automatic transfer is set or released by the accounting system in accordance with an instruction from a payee. The accounting system is concentrically managed at a computer center.

The above-mentioned prior art is based on, for example, the manual operation of a dedicated telephone or a personal computer by a payer. Therefore, for example, the payment of a premium involves a problem that the payer has to perform a manual operation similarly each time, notwithstanding that an amount payable and a due date are known from a contract beforehand.

SUMMARY OF THE INVENTION

An object of the present invention made in light of the above circumstances is to solve the problem in the prior art as mentioned above, thereby realizing a system which makes it possible to automatically perform a payment having an amount payable and a due date both known from a contract beforehand.

More particularly, the object of the present invention is to provide an electronic money automatic payment method which makes it possible to automatically perform a payment having an amount payable and a due date both known from a contract beforehand, thereby reducing the complexity of payment and surely performing the payment, and the present invention further relates to an electronic money holding device which is suitable for the use in such a method.

The present invention provides an electronic money holding device which includes first storage means for storing an identification number of a personal electronic money holding device and the balance of electronic money held therein. A central processing unit has a procedure for performing the reference to, and the updating of, the balance of electronic money, and a procedure for controlling the transfer of electronic money between the personal electronic money holding device and another electronic money holding device, in which there is provided second storage means for storing information for each of one or more contracts concluded between a service provider and a payer of a counter value for a provided service (or a service buyer). The stored information includes an amount payable from the service buyer to the service provider, a due date for payment of that amount, an identification number of an electronic money holding device of the service provider, and information for making access to an electronic money holding device of the service buyer in a network to which the electronic money holding device of the service provider and the electronic money holding device of the service buyer are connected.

Also, the present invention provides an electronic money payment method for performing the payment from the service buyer to the service provider by use of the above-mentioned electronic money holding device. Such method comprises a step of acquiring a date, a step of reading the amount payable from the service buyer to the service provider and the due date prescribed by the contract from the second storage means of the above-mentioned electronic money holding device, and a step of remitting, in the case where the acquired date is the read due date, electronic money from the service buyer to the service provider.

Further, the present invention provides a method and a device for writing information into the second storage means of the above-mentioned electronic money holding device.

BRIEF DESCRIPTION OF THE DRAWINGS

FIG. 2 is a flow chart of an automatic payment control procedure 17 performed by a user's computer 7 shown in FIG. 1; and FIG. 3 is a flow chart for explaining the details of an electronic money payment process in step 29 shown in FIG. 2.

DESCRIPTION OF THE PREFERRED EMBODIMENTS

Figure 1:
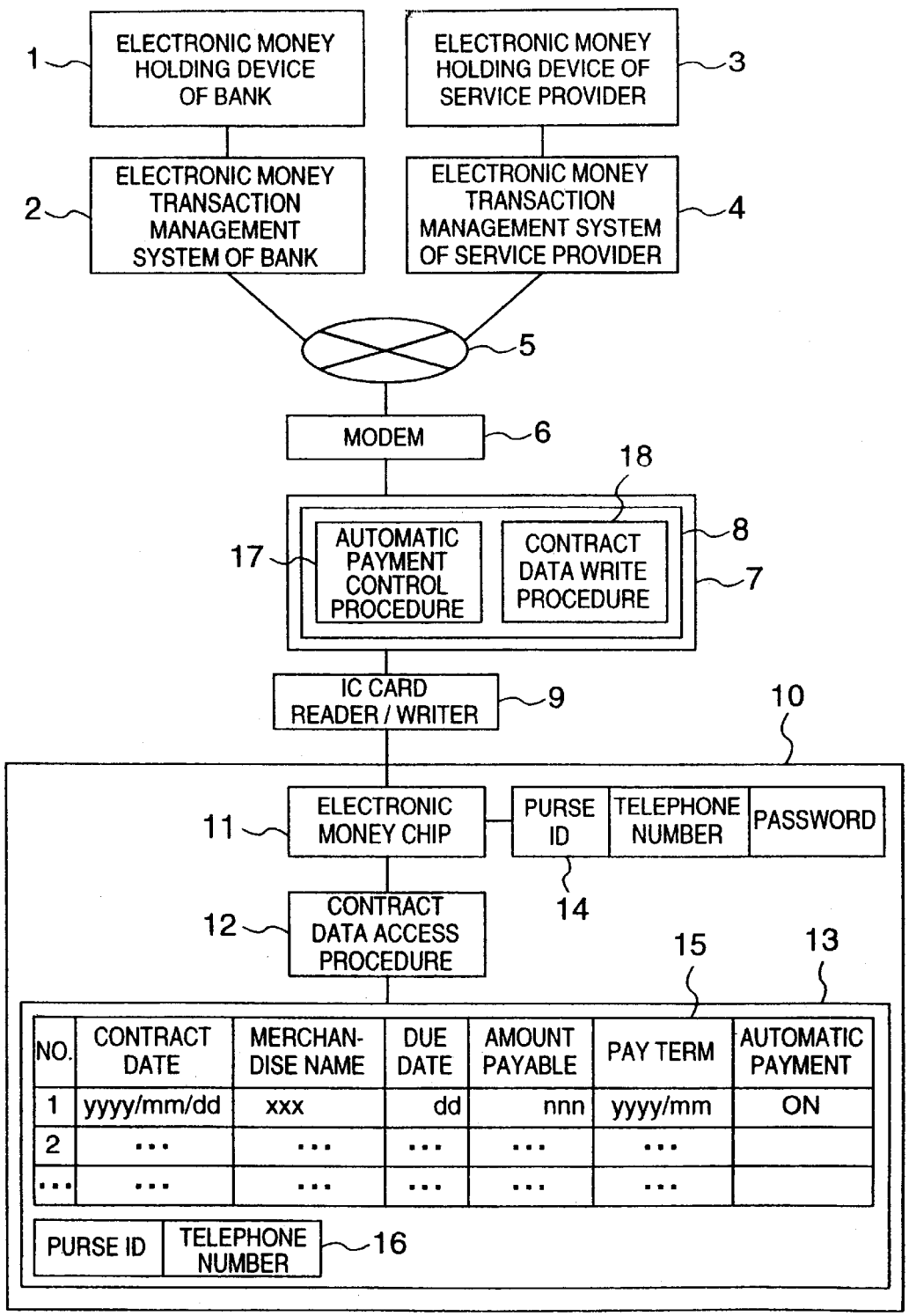
FIG. 1 is a diagram showing the construction of an IC card 10 which is an electronic money holding device according to an embodiment of the present invention and an electronic money transaction system which uses the IC card.

In the following, example embodiments of the present invention will be described in detail on the basis of the drawings.

(1) Electronic Money Transaction System

FIG. 1 is a diagram showing the construction of an IC card 10 which is an electronic money holding device according to an embodiment of the present invention and an electronic money transaction system which uses the IC card. In the figure, reference numeral 10 denotes an IC card as an electronic money holding device according to the present embodiment, numeral 9 an IC card reader/writer, numeral 7 a computer such as a personal computer used by a user of the IC card as the electronic money holding device, and numeral 8 an auxiliary storage unit provided in the computer 7. In the auxiliary storage unit 8 are stored an automatic payment control procedure 17 and a contract data write procedure 18 which will be mentioned later on. The procedures 17 and 18 are performed by the computer 7. Also, numeral 6 denotes a modem for performing the modulation of a transmit signal and the demodulation of a receive signal, numeral 5 a public line such as a telephone network or the like, numeral 3 an electronic money holding device of a service provider, numeral 4 an electronic money transaction management system of the service provider, numeral 1 an electronic money holding device of a bank, and numeral 2 an electronic money transaction management system of the bank.

It is general that there a plurality of service providers are involved. Accordingly, there may exist a plurality of sets of a service provider electronic money holding device and a service provider electronic money transaction management system.

Each of the electronic money transaction management systems 2 and 4 includes a unit for reading/writing for the IC card and a unit for connection with the public network.

(2) Electronic Money Holding Device

Next, the internal construction of the IC card 10 as the electronic money holding device will be described using FIG. 1.

This kind of IC card is known as a MONDEX brand/type of card, which is under experiment in the city of SWINDON in England. However, another kind of IC card, such as a SVC (Stored Value Card) type IC card, may be used.

A main part of the IC card is a portion 11 provided with a storage unit for storing an identification number uniquely applied to each of all IC cards and the balance of held electronic money, and a central processing unit for storing and executing a procedure for performing the reference to and the updating of the balance, and a procedure for controlling the transfer of electronic money between this IC card 10 and another electronic money holding device. (Hereinafter, the portion 11 will be referred to as "electronic money chip".) The encipherment of the balance is also performed in this money chip 11.

In addition to this, the IC card 10 in the present embodiment is provided with a contract data table 13 for storing that payment data 15 for each of one or more contracts concluded between a user of the IC card 10 (or a service buyer) and a service provider which includes a contract date, a contract merchandise name, an amount payable from the service buyer to the service provider, a due date for payment of that amount, information indicative of whether or not an automatic payment is to be made, and so forth. Further included is a table 16 for service provider electronic money transaction management system data inclusive of a purse ID and a telephone number which is used at the time of transmission and reception of information for the electronic money transaction management system 4. The IC card 10 may further include a procedure 12 for access to the contract data table 13. The IC card 10 is further provided with a table 14 for bank electronic money transaction management system data inclusive of a purse ID, a telephone number, a password and so forth, used at the time of transmission and reception of information for the bank electronic money transaction management system 2.

The purse ID's in the tables 14 and 16 are used for identifying the bank electronic money holding device 1 and the service provider electronic money holding device 3, respectively. The purse ID may be an identification number uniquely applied to each electronic money holding device. The telephone number is used when access is made to the bank or service provider transaction management system 2 or 4 through the public line 5. The password in the table 14 is used when electronic money is drawn from the bank, as will be mentioned later on. However, it is not necessary that the password is always stored in the IC card 10. For example, it may be constructed such that a password inputted by a user from the computer 7 is stored into the table 14 of the IC card 10 when the IC card 10 is inserted into the IC card reader/writer 9, and the password in the IC card 10 is automatically erased when the IC card 10 is drawn out of the IC card reader/writer 9.

In the case where contracts are concluded with a plurality of service providers, a plurality of sets of tables 15 and 16 are generated in the contract data table 13.

The contents of the tables 13 and 14 may be enciphered when they are written into the IC card 10. The encipherment can be performed using an enciphering function possessed by the electronic money chip 11. Alternatively, the encipherment may be performed by the contract data access procedure 12.

The storage unit in the IC card can be realized by an EEPROM (Electrically-Erasable Programmable ROM) or the like. The tables 13 and 14 may be stored in the EEPROM possessed by the electronic money chip 11 for storage of the identification number and the balance, or may be stored in a separately provided EEPROM or another storage medium.

(3) Automatic Payment

The electronic money holding device 10 has two ways of use as follows. A first way is a method in which a user carries about the device 10 as an IC card to use it in lieu of a purse at a shop or the like. A second way is a method in which the device 10 is installed at a home, shop, bank or the like as a stationary device having the same electronic money chip incorporated therein so that it is used in lieu of a money safe. However, the latter device may be incorporated with the IC card itself which is used in the first way.

The IC card 10 used in lieu of the money safe is usually placed in a state in which it is always set to the IC card reader/writer 9 connected to the computer 7 which the user uses everyday. In this state, the automatic payment is performed.

Namely, data concerning the payment is read from the IC card 10 through the automatic payment control procedure 17 stored in the auxiliary storage unit 8 provided in the computer 7 to control the electronic money chip 11, thereby performing the payment to the service provider.

This payment is transmitted to the service provider electronic money transaction management system 4 connected to the computer 7 by the public line 5 through the modem 6, and is stored as electronic money into the service provider electronic money holding device 3 (for example, the IC card).

The bank electronic money transaction management system 2 is connected to the computer 7 through the public line 5, and is an electronic money transaction management system of a bank as the other party for which the user performs an operation for the deposition or drawing of electronic money of the IC card 10. A bank and a service provider may be the same trade. In this case, the electronic money holding devices 1 and 3 are the same. Similarly, the electronic money transaction management systems 2 and 4 are the same.

FIG. 2 is a flow chart of the automatic payment control procedure 17 performed by the computer 7 of the user. This automatic payment control procedure 17 is performed as a scheduled job at the time of first boot of the computer 7 every day or at a specified instant of time every day. It is supposed that the IC card 10 of the user is always placed in a state in which it is inserted in the reader/writer 9.

In the procedure 17, the date as managed by the computer 7 is first acquired (step 21). As an initializing process, a total amount payable is set to 0 (step 22). Next, access to the IC card 10 is made through the IC card reader/writer 9 to read payment data 15 (step 23). The payment data 15 is read until records of the payment data 15 run out (steps 23 to 25). In the case where a due date coincides with the date acquired in step 21, a process for adding an amount payable to the total amount payable (steps 26 and 27) is repeated.

When the records of the payment data 15 run out and the total amount payable is not 0 (step 28), the total amount payable is paid to the service provider through an electronic money payment process shown in FIG. 3 (step 29). Thereafter, a settled-payment record in the payment data 15 is erased (step 30), thereby completing the execution of the procedure.

In the case where the contract data 13 includes a plurality of payment data tables 15 and service provider electronic money transaction management system data tables 16, steps 22 to 30 are repeated for the payment data table 15 corresponding to each service provider.

FIG. 3 is a flow chart for explaining the details of the electronic money payment process shown by step 29 in FIG. 2.

First, when the process is called, the balance of electronic money of the IC card 10 is read (step 41). The read balance (A) and the total amount payable (B) determined in step 27 shown in FIG. 2 are compared (step 42). If $A \geq B$, service provider electronic money transaction management system data 16 held by the IC card 10 is read (step 49) and a call through the telephone number of the service provider is made (step 50). When the computer 7 of the user and the service provider electronic money transaction management system 4 are connected, a purse ID in the table 16 of the IC card 10 is used to check whether or not the connection is made to a correct party. If the confirmation of the correct party is obtained, the whole amount of electronic money corresponding to the above-mentioned amount B is transmitted from the IC card 10 of the user to the service provider electronic money transaction management system 4 (step 51). At this time, contract information concerning the transmitted electronic money, for example, contract date, merchandise name or contract number may be transmitted simultaneously. The transmission of electronic money is performed by use of the existing protocol such as MONDEX VTP (Value Transfer Protocol) used in the MONDEX system. The identification of the remitter is also made by use of this protocol. When the remittance is completed, the line is disconnected (step 52), thereby completing the process.

On the other hand, if A<B as the result of comparison in step 42, it is indicated that the balance of electronic money of the IC card 10 is insufficient. Hence, after the drawing of necessary electronic money from a party such as a bank which makes a service for the deposition and drawing of electronic money, a process similar to that in the case of $A \geq B$ as mentioned above is performed.

In order that the user draws electronic money from the bank, bank electronic money transaction management system data 14 possessed by the IC card 10 is read (step 43) and a call through the telephone number of the bank is made (step 44). When the computer 7 of the user and the bank electronic money transaction management system 2 are connected, a purse ID in the table 14 of the IC card 10 is used to check whether or not the connection is made to a correct party. Subsequent to the confirmation of the correct party, a request for the drawing of electronic money corresponding to B–A is made to the bank electronic money transaction management system 2 (step 45). At this time, the electronic money payment process includes transmitting an identification number of the IC card 10 of the user as well as a password in the table 14. The bank electronic money transaction management system makes the authentication of electronic money drawing on the basis of the transmitted identification number and password. In the case where the authentication is made and the balance of electronic money in a bank account is equal to or greater than (B–A) (step 46), the transmission from the bank electronic money transaction system 2 (or the drawing of electronic money) is performed using the above-mentioned MONDEX VTP or the like. Thereafter, the electronic money payment process performs the disconnection of the line from the bank electronic money transaction system 2 (step 48).

The subsequent operation (steps 49 to 52) is similar to that in the above-mentioned case of $A \geq B$.

In the case where the balance of electronic money of the user is insufficient and the drawing of the above-mentioned electronic money corresponding to (B–A) is impossible, the process is completed with an error message being left, for example, in a mail form (steps 46 and 47).

In the MONDEX system, if the transfer of electronic money is performed, its log (or journal) for ten latest transactions is recorded in the IC card.

In the present embodiment, a record of access to the service provider or bank and a record of the transfer of electronic money or a failure in transfer may be left in the storage unit of the computer 7 through the automatic payment control procedure 17, in addition to the above record.

Also, though FIG. 2 shows that the automatic payment control procedure 17 performs the erasure of the settled-payment record in the IC card 10, a settlement flag may be provided in the payment table 15 so that in the case where the payment is performed, the flag is updated.

In the case where the user uses the IC card which he or she carries habitually in lieu of cash, it is necessary to activate the automatic payment control procedure after the insertion of the IC card 10 into the reader/writer 9.

(4) Writing of Contract Data

The generation and writing of contract data 13 of the IC card 10 are performed by the contract data write procedure 18 on the computer 7 when a contract is concluded between a service provider and a user.

In the contract data write procedure 18, the user inputs information of the service provider and the contents of the contract by use of a menu display screen or the like and this data is written into the tables 15 and 16 of the IC card 10 through the IC card reader/writer 9. In the case where the service provider under consideration has already been registered in the IC card 10, a search is made for an idle record or the oldest settled-payment record of the payment data table 15 corresponding to the service provider under consideration, and the contents of the contract are written into that record. In the case where the designated service provider has not yet been registered in the IC card, tables 15 and 16 are newly generated and the information is written into the tables. In the case where there is no idle area on the storage unit of the IC card 10, the contract data write procedure 18 outputs an error message to a display unit of the computer 7.

The contract data write procedure 18 has a function of reading information of the tables 14, 15 and 16 written in the IC card once and correcting the information.

The contract data write procedure 18 may extract necessary items from contract conditions presented by the service provider to write them into the IC card.

(5) Effects

According to the above-mentioned embodiment, since a payment having an amount payable and a due date known from a contract beforehand becomes able to be performed automatically by use of electronic money, it is possible to realize an electronic money automatic payment method in which the complexity of payment is reduced and the payment is surely performed and an electronic money holding device which is suitable for the use in such a method.

Further, since a process for performing the payment of a relatively small amount on a date prescribed by a contract can be executed without relying on an accounting system of a bank, it becomes possible to reduce a load imposed on the accounting system, thereby making the effective use of a computer resource.

In the case where there is no relying on the accounting system of the bank, there is obtained a practical merit in that it becomes possible to reduce a handling fee which a service provider pays to the bank.

Further, since the setting of an automatic payment is made by an electronic money holding device possessed by a user and a computer to which the electronic money holding device is connected, there is also obtained an effect that the setting of a flexible automatic payment based on a payer's intention becomes possible.

What is claimed is:

1. In a system including a device attachable with an IC card storing electronic money, and including electronic money transaction management apparatuses for an electronic money supplier and an electronic money payee, the device being connected to the electronic money transaction management apparatuses via a network, a method of automatically paying electronic money from the device to the electronic money transaction managing apparatus of the payee via the network, comprising:

reading payment data of an electronic money transaction from the IC card;

obtaining a payment amount from the payment data having a payment due date indicating that payment should presently be made;

obtaining a balance of the electronic money in the IC card;

comparing the payment amount with the balance;

if the payment amount is larger than the balance, receiving additional electronic money, which amount corresponds to a difference between the payment amount and the balance, from the electronic money transaction management apparatus of the electronic money supplier; and sending the electronic money corresponding to the payment amount to the electronic money transaction management apparatus of the payee.

2. An electronic money payment method according to claim 1, wherein the IC card includes the payment data including the payment amount, the payment due date, and an identifier for uniquely identifying the payee for each contract between the payee and a possessor of the IC card, and includes information for accessing and uniquely identifying the electronic money transaction management apparatuses of the electronic money supplier and the payee.

3. An electronic money payment method according to claim 2, wherein, if there are plural payment data entries having the same payee and the same payee due date in the IC card, the payment amounts of the plural payment data entries are added and the electronic money-sending step is performed once.

4. An electronic money payment method according to claim 2, wherein each payment data has a flag indicating whether the automatic payment is acceptable or not, and the steps for automatic payment are performed for payment data having a flag indicating that the automatic payment is acceptable.

5. An electronic money payment method according to claim 1, comprising:

before receiving electronic money from the electronic money transaction management apparatus of the electronic money supplier, performing an authentication process such that the IC card is authenticated by the electronic money supplier.

6. An electronic money payment system including:

an IC card for storing electronic money card including payment data including a payment amount, a payment due date, and an identifier for uniquely identifying a payee for each contract between the payee and a possessor of the IC card, and including information for accessing and uniquely identifying an electronic money transaction management apparatuses of an electronic money supplier and the payee; and a device attachable with the IC card and connectable to the electronic money transaction management apparatuses of the electronic money supplier and the payee via a network, including:

means for reading payment data from the IC card, including a payment amount of payment data having a payment due date indicating that payment should presently be made, and a balance of the electronic money from the IC card, and comparing the payment amount with the balance;

means for receiving, if the payment amount is larger than the balance, additional electronic money, which amount corresponds to a difference between the payment amount and the balance, from the electronic money transaction management apparatus of the electronic money supplier; and means for sending the electronic money corresponding to the payment amount to the electronic money transaction management apparatus of the payee.

* * * * *